Patented Aug. 26, 1941

2,254,129

UNITED STATES PATENT OFFICE 2,254,129

GERMICIDE

Frederick W. Ames, New Orleans, La.

No Drawing. Application March 2, 1940,
Serial No. 321,986

2 Claims. (Cl. 167—25)

This invention is a germicide.

It is well known that phenol or carbolic acid is a powerful germicide in concentrated solution and will also exert a definite bacteriostatic action when diluted. However, phenol solutions which are sufficiently strong to be germicidal are also caustic and irritant and dry gangrene has often followed where topical (water solutions) applications were used in solutions as weak as ¼ of 1% when applied to terminals such as toes and fingers, thereby requiring amputation of the parts affected. Therefore, the medical world has practically dispensed with the usage of phenol or carbolic acid in topical application due to the above described action following external usage.

Numerous attempts have been made to find a diluent which would mitigate the caustic effect of phenol on skin layers and body tissue but which would not destroy the efficacy of the germicidal action of phenol.

It is an object of the present invention to provide a solution of phenol combined in varying proportions with oil of thyme in varying proportions of ethyl alcohol.

It further has been found that the addition of oil of thyme to phenol, alcohol, vegetable oil, mineral oil, grease, ointments, glycerine or water solutions, when diluted corrects the caustic or irritating action of phenol without in any way interfering with the germicidal action of the phenol and when applied to wounds or the membranes of the human body no deleterious effects will be had while on the other hand the bacterial characteristics of the phenol will not be lessened even in weak dilutions of the phenol and oil of thyme combinations.

A further object of the invention is the provision of a first aid and household preparation in ethyl alcohol with positive germicidal qualities that can be applied without caustic or irritating effects or without destroying membranes or the cells of open wounds. The preparation is not a poison, does not stain the tissue, and has no ill effects on skin layers nor does the application obscure the field of damage should a physician be needed. Repair or healing usually takes place after the first application.

This invention will be best understood from a consideration of the following detailed description, nevertheless, it is to be understood that the invention is not confined to the disclosure, being susceptible of such changes and modifications as define no material departure from the salient features of the invention as expressed in the appended claims.

In carying out the method of preparing the germicide the following ingredients and their quantities may be employed as an example:

Phenol (carbolic acid) liquid fluid ounces__ 15
Oil of thyme_____do__ 15
Oil of sassafras, natural_____do__ 1
Oil of citronella (Java)_____do__ ½
Glycerine _____ 10
Ethyl alcohol, Q. S. gallons_____ 5
Brown dye, certified for light amber color.

The first five ingredients in the proportions noted above are thoroughly mixed together and then the mixture stirred into the ethyl alcohol after which the solution is filtered to provide a finished product. The alcohol employed is that known as 23A and manufactured and sold under a formula prescribed by the U. S. Government. The formula calls for 100 gallons ethyl alcohol and 10 gallons of acetone. Pure ethyl alcohol may be used but due to the fact that on pure alcohol there is a revenue tax it is highly expensive and the denatured alcohol as described above is employed. It is known that diluted alcohol (70%) is possibly more effective as a germicide for destroying certain types of bacteria than pure alcohol, nevertheless, it is feeble at best.

Phenol is known to posses positive germicidal action but at the same time it is recognized by the medical profession as a most dangerous drug due to its caustic action and irritation in concentrated solutions and even on dilutions when applied to skin layers and open wounds on the human body. Weak dilutions when applied as a wet pack to the hands and feet have at times caused dry gangrene of the terminals, such as, the toes and fingers necessitating amputation of these parts. Notwithstanding its high and thorough germicidal efficacy it has practically been discarded by the medical profession due to the above-mentioned erratic action.

By the addition of oil of thyme to phenol through synthesis (no chemical reaction), I find that phenol in weak solutions as low as 1 and 2% is energized by the addition of similar amounts of oil of thyme in varying solutions with an unbelievable germicidal efficiency without injury to skin layers, open wounds and cells or membranous tissues of the human body.

Phenol is a product of coal tar distillation. Oil thyme is an essential oil distilled from garden thyme. Glycerine is a by-product in breaking down of animal fat. Oils of sassafras and citronella are essential oils. Sassafras and citronella function as a blend to mask the odor of phenol. All of these products are organic compounds. Glycerine, a non-volatile at ordinary temperature, functions as a binder to maintain the germicide in contact with the skin layers, cells and mucous membranes of the body. However, the glycerine in no way subtracts from the germicidal action of the solution, but due to its affinity for moisture it allows deeper penetration of the germicide in cell tissue and thus allays irritation and soreness and a cure is effected more quickly.

I claim:

1. A germicide comprising fifteen fluid ounces of phenol, fifteen fluid ounces of oil of thyme and five gallons of ethyl alcohol.

2. A germicide comprising a dilute alcoholic solution of equal parts of phenol and oil of thyme.

FREDERICK W. AMES.